(12) United States Patent
Wnukowski et al.

(10) Patent No.: US 12,245,613 B2
(45) Date of Patent: Mar. 11, 2025

(54) METHOD FOR PREPARING PROTEIN-FIBRE CONCENTRATES FROM PLANT MATERIAL

(71) Applicant: NapiFeryn BioTech sp. z o.o, Lodz (PL)

(72) Inventors: Piotr Wnukowski, Delft (NL); Magdalena Kozlowska, Lodz (PL); Lukasz Stanczyk, Lodz (PL); Danuta Alina Rachwal, Ozorkow (PL)

(73) Assignee: NapiFeryn BioTech sp.zo.o, Lodz (PL)

( * ) Notice: Subject to any disclaimer, the term of this patent is extended or adjusted under 35 U.S.C. 154(b) by 955 days.

(21) Appl. No.: 17/260,240

(22) PCT Filed: Jul. 16, 2019

(86) PCT No.: PCT/EP2019/069113
§ 371 (c)(1),
(2) Date: Jan. 14, 2021

(87) PCT Pub. No.: WO2020/016222
PCT Pub. Date: Jan. 23, 2020

(65) Prior Publication Data
US 2021/0298323 A1 Sep. 30, 2021

(30) Foreign Application Priority Data
Jul. 17, 2018 (NL) .................................... 2021320

(51) Int. Cl.
*A23J 1/14* (2006.01)
(52) U.S. Cl.
CPC .................................... *A23J 1/142* (2013.01)

(58) Field of Classification Search
CPC .................................... A23J 1/142; A23J 1/14
(Continued)

(56) References Cited

U.S. PATENT DOCUMENTS 3,734,901 A 5/1973 Hayes et al.
4,158,656 A 6/1979 Jones et al.
(Continued)

FOREIGN PATENT DOCUMENTS

CN 101942713 1/2011
CN 103732076 A 4/2014
(Continued)

OTHER PUBLICATIONS

Lai et al. Trends in Food Science & Technology 59 (2017) 148-160 http ://www.journals .elsevier.com/trends-in-food-science-and-technology (Year: 2017).*

*Primary Examiner* — Subbalakshmi Prakash
(74) *Attorney, Agent, or Firm* — N.V. Nederlandsch Octrooibureau (57) ABSTRACT

The present invention concerns a process wherein native and functional protein-fibre concentrates can be successfully obtained from plant material such as oilseeds, legumes and lentils. This can be achieved by a proper pre-treatment of the plant material, followed by a method of partial extracting water-soluble proteins under mild and non-destructive conditions using an aqueous solvent, followed by purification of the solid residue using a novel combination of GRAS organic solvents.

21 Claims, 2 Drawing Sheets

(58) Field of Classification Search
USPC .......................................................... 426/481
See application file for complete search history.

(56) References Cited

U.S. PATENT DOCUMENTS

| | | |
|---|---|---|
| 2006/0257540 A1 | 11/2006 | Koyama et al. |
| 2010/0136173 A1 | 6/2010 | Tang |
| 2011/0057408 A1 | 3/2011 | Koschinat |
| 2017/0318834 A1* | 11/2017 | Wnukowski .............. A23J 3/14 |
| 2018/0173041 A1 | 6/2018 | Zhan et al. |

FOREIGN PATENT DOCUMENTS

| | | |
|---|---|---|
| CN | 106998741 A | 8/2017 |
| EP | 2498620 | 9/2012 |
| EP | 2783576 | 10/2014 |
| EP | 2783576 A | 10/2014 |
| JP | 2012-100647 A | 5/2012 |
| WO | 2008010156 | 1/2008 |
| WO | 2009137934 | 11/2009 |
| WO | 2011057407 | 5/2011 |
| WO | 2011057408 | 5/2011 |
| WO | 2012135955 | 10/2012 |

* cited by examiner

METHOD FOR PREPARING PROTEIN-FIBRE CONCENTRATES FROM PLANT MATERIAL

FIELD OF THE INVENTION

The present invention relates to a process for preparation of protein-fibre concentrates from plant materials such as oilseeds and to protein-fibre concentrates obtainable via said process. The invention further relates to the use of protein-fibre concentrates and protein-fibre concentrates obtainable via said process in food.

BACKGROUND OF THE INVENTION

Proteins present in plant-based sources such as grains, legumes or oilseeds are usually embedded in complex matrices comprising fibres, sugars, polysaccharides, fats, lipids, micronutrients and anti-nutritional factors, like phenolic compounds, phytates, et cetera. To be applied as ingredients in food formulations, these proteins have to be purified from unwanted components present in the source material. There are generally two options of delivering protein-rich products derived from plant-based sources, resulting in two distinct classes of protein-rich products: protein isolates and protein concentrates.

In processes aiming at obtaining protein isolates, proteinaceous matter present in the source material is first solubilized and extracted from the source material using suitable solvents and is subsequently purified from unwanted components by suitable methods such as diafiltration, adsorption, chromatography, selective precipitation, et cetera, to be finally isolated in a purified form, typically in a form of powder obtained by suitable method of drying.

Alternatively, proteinaceous matter may be recovered without solubilisation and is passed to the product in non-soluble form while soluble components are removed from the source material using suitable solvents and by employment of suitable leaching techniques. Products of such processes are called protein concentrates. Present invention pertains to novel technique to obtain protein concentrates, in particular a protein-fibre concentrate.

The prior art discloses processes where canola protein concentrates were obtained by removing seed coat (to reduce fibre fraction), and using alcohol to remove alcohol-soluble compounds like sugars, glucosinolates, phytates and some phenolics. Using this approach, it was possible to enrich protein content in the concentrate obtained up to ~70% (J. P. D. Wanasundara et al., Oilseeds and fats, Crops and Lipids, 2016, 23(4), D407; J. P. D. Wanasundara, *Critical Reviews in Food Science and Nutrition*, 2011, 51(7), 635-677).

M Das Purkayastha et al., 2013 and M Das Purkayastha et al., 2014 describe methods where different solvent mixtures containing acetone or methanol pure or combined with water or an acid (hydrochloric, acetic, perchloric, trichloroacetic, phosphoric) were tested for their efficiency for extraction of antinutritive compounds from rapeseed press-cake.

EP2783576A1 deals with a method to produce rape protein concentrate from mechanically de-oiled rapeseed kernel comprising
   (a) recirculation of high protein press cake (HPRC) and mixing with rapeseed kernel fraction (RKF) to increase friction and pressure in screw press;
   (b) partially deoiling of rapeseed kernel fraction (RKF) in screw press with or without prior heating and drying;
   (c) washing of HPRC with aqueous alcohol solution in order to remove partially sugars, tannins, sinapins, glucosinolates to produce RCPC with oil content of from 5 to 25% (w/w) and
   (d) drying of RCPC in temperatures in the range of 60-120° C. till water content in RCPC is less 10%

Protein concentrate obtained according to this method contained significant amounts of oil which has not been removed by ethanol washing step described in (c).

WO2011/057407A1 discloses methods for obtaining protein concentrates and isolates from toasted meals of rapeseed/canola. Fats and lipids are removed from the source material by use of hexane or other mineral low-boiling solvents with subsequent removal of solvent residues by desolventization-toasting using high temperature steam.

While these aforementioned processes provide means to prepare protein concentrates, in particular protein-fibre concentrates, purified from some anti-nutritional factors originating from source material, they do not solve fundamental problem of providing efficient, scalable method of obtaining protein concentrates from oilseeds with low fat content and preserved nativity and functionality of proteins, which properties are essential for protein concentrates to be applied as valuable ingredients in food. Conventionally processed meal which has gone through a desolventizer-toaster is not an efficient starting material for protein recovery, due to harsh conditions that cause partial denaturation of the protein when it is exposed to steam and high temperatures. Currently, there isn't a viable oil extraction technique that can replace this process without using solvent. Possible solutions, like low temperature toasters would require expensive retrofitting of processing plants. Expeller pressing is an alternative oil extraction process, but if a cold-pressing process is used, the meal that is generated is too high in residual oil. Expeller pressed meal with low oil content has highly interacted protein somewhat similar to desolventizer-toasted meal. Although cold-pressed meal can be utilized for further recovery of oil, protein and other co-products, the economics of the technology and products needs to be competitive (Campbell L. et. al, 2015)

SUMMARY OF THE INVENTION

It is an object of the invention to provide a process for preparation of protein-fibre concentrate in purified form from plant material, particularly from plant material containing considerable amounts of oils, fats and/or lipids.

It is a further object of the invention to provide a process for the preparation of protein-fibre concentrates, wherein the native functional properties of the protein are retained during the process such that the resulting protein-fibre concentrates are suitable for human consumption.

It is a still further object of the invention to provide an economically feasible process for the preparation of the protein-fibre concentrates, said protein-fibre concentrates being main proteinaceous product of the said process.

It is a still further object of the invention to provide an economically feasible process for the preparation of the protein-fibre concentrates where said protein-fibre concentrates are obtained as side stream of the process, wherein main proteinaceous product of the process is protein isolate.

The present invention addresses the above objects by providing a scalable and economically viable process wherein native and functional protein-fibre concentrates can be successfully obtained from plant material containing considerable amounts of oils, fats and/or lipids such as oilseeds, legumes and lentils. This can be achieved by a proper pre-treatment of the plant material, followed by a method of extracting water soluble components of the plant material under mild and non-destructive conditions using an aqueous solvent, followed by fractionation, concentration and further purification using a novel combination of GRAS organic solvents. In other words, concentrates of protein-fibres in aqueous solutions are prepared using techniques of extraction, fractionation and concentration known in the prior art followed by the replacement of the aqueous extraction solvent by at least two other solvents in a sequence of declining polarity of the subsequently applied solvents, whereby:
  i) the main component of the first aqueous solvent used for the initial extraction step is thus water;
  ii) the main component of the second solvent belongs to the group of alcohols having 1 to 5 carbon atoms being miscible with water at room temperature; and
  iii) the main component of the third solvent is an apolar solvent belonging to the group of organic esters which are miscible with the second solvent but which are only partially miscible with the first solvent at room temperature.

Accordingly, a first aspect of the invention relates to a process for the preparation of a protein-fibre concentrate from plant material, wherein said plant material comprises between 10 and 50 wt % on dry weight basis of proteins, said process comprising the steps of:
  a) crushing or comminuting the plant material to produce a solid cake;
  b) extracting the solid cake obtained in step a) using a first solvent comprising at least 90 wt % of water, based on the total weight of the first solvent, to obtain a mixture of a first solid fraction and a first liquid fraction;
  c) separating the first liquid fraction from the first solid fraction;
  d) adding a second solvent to the first solid fraction obtained in step c), wherein the second solvent comprises at least 60 wt %, preferably at least 70 wt %, more preferably at least 80%, most preferably at least 90 wt % of an alcohol having 1 to 5 carbon atoms which is miscible with water at room temperature, based on the total weight of the second solvent;
  e) separating the mixture obtained in step d) into a second liquid fraction and a second solid fraction using a technique chosen from the group consisting of filtration, sedimentation, centrifugation and combinations thereof;
  f) adding a third solvent to the second solid fraction obtained in step e), said third solvent comprising at least 90 wt %, preferably at least 95 wt %, more preferably at least 98 wt %, more preferably at least 99 wt %, most preferably, about 99.5 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;
  g) separating the mixture obtained in step f) into a third liquid fraction and a third solid fraction using a technique chosen from the group consisting of filtration, sedimentation, centrifugation and combinations thereof;
  h) subjecting the third solid fraction obtained in step g) to a technique chosen from the group consisting of vacuum drying, spray drying, superheated steam drying and/or combinations thereof to obtain a protein-fibre concentrate wherein the total content of protein and indigenous fibre is at least 30 wt %, based on total dry weight of the concentrate.

The invention further relates to a protein-fibre concentrate comprising at least 30 wt % of indigenous protein and indigenous fibre based on dry matter, less than 1 wt % carbohydrates (simple sugars), less than 0.1 wt % phenolic compounds and no organic or mineral solvents having 6 or more carbon atoms.

The invention also relates to a protein-fibre concentrate obtainable by the process as defined hereinbefore.

In a still further aspect, the invention relates to the use of the protein-fibre concentrate as defined hereinbefore, or obtainable by the process as defined hereinbefore, in food.

DEFINITIONS AND ABBREVIATIONS

The term 'meal' as used herein refers to plant material in powder form, such as flour, said plant material virtually devoid of oil and lipids by extraction of these oils and lipids with organic or mineral solvents such as hexane with subsequent removal of said solvents by toasting with water steam. The terms 'mineral solvent' as used herein refers to solvents derived from fossil deposits like petroleum or bituminous coal by processes of cracking, refinery and/or rectification. The term 'plant material' as used herein has its conventional meaning and refers to material derived from plants, encompassing vegetables, fruits, seeds, legumes and grains. The term 'raw plant material' as used herein has its conventional meaning and refers to crude plant material that can be converted by processing according to the present invention into a new and useful product such as protein isolate containing proteins originally present in the crude plant material. The term 'room temperature' as used herein is a temperature between 18 and 25° C.

The terms 'indigenous protein' and indigenous fibre' as used herein refer to native protein and native fibre. Consequently, if the final protein-fibre concentrate contains indigenous protein and indigenous fibre, this protein and fibre cannot be distinguished from the native protein and native fibre present in the unprocessed plant material.

The term 'room temperature' as used herein is a temperature between 18 and 25° C.

The abbreviation 'GRAS solvents' stands for solvents that are 'Generally Regarded As Safe' and belong to Class 3 in accordance with: Guidance for Industry, Q3C—Tables and List, U.S. Department of Health and Human Services, Food and Drug Administration Center for Drug Evaluation and Research (CDER), Center for Biologics Evaluation and Research (CBER), February 2012, ICH, Revision 2. In this respect, reference is made to https://www.fda.gov/downloads/drugs/guidances/ucm073395.pdf.

The abbreviations 'EA' and 'ES' respectively stand for 'Emulsifying Activity' and 'Emulsifying Stability'. The abbreviation 'STR' stands for 'Stirred Tank Reactor'. The abbreviation 'ALSEOS' stands for 'Aqueous Low Shear Extraction of Oil Seeds'. The abbreviations 'CV', 'G', 'rpm', 'DW' and 'NS' respectively stand for 'Column Volume', 'Gravity', 'revolutions per minute', 'Dry Weight' and 'Nitrogen Solubility'.

DETAILED DESCRIPTION OF THE INVENTION

In a first aspect the invention provides a process for the preparation of a protein-fibre concentrate from plant material, wherein said plant material comprises between 10 and 50 wt % on dry weight basis of proteins, said process comprising the steps of:
a) crushing or comminuting the plant material to produce a solid cake;
b) extracting the solid cake obtained in step a) using a first solvent comprising at least 90 wt % of water, based on the total weight of the first solvent, to obtain a mixture of a first solid fraction and a first liquid fraction;
c) separating the first liquid fraction from the first solid fraction;
d) adding a second solvent to the first solid fraction obtained in step c), wherein the second solvent comprises at least 60 wt %, preferably at least 70 wt %, more preferably at least 80 wt %, most preferably at least 90 wt % of a alcohol having 1 to 5 carbon atoms which is miscible with water at room temperature, based on the total weight of the second solvent;
e) separating the mixture obtained in step d) into a second liquid fraction and a second solid fraction using a technique chosen from the group consisting of filtration, sedimentation, centrifugation and combinations thereof;
f) adding a third solvent to the second solid fraction obtained in step e), said third solvent comprising at least 90 wt %, preferably at least 95 wt %, more preferably at least 98 wt %, more preferably at least 99 wt %, most preferably, about 99.5 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;
g) separating the mixture obtained in step f) into a third liquid fraction and a third solid fraction using a technique chosen from the group consisting of filtration, sedimentation, centrifugation and combinations thereof;
h) subjecting the third solid fraction obtained in step g) to a technique chosen from the group consisting of vacuum drying, spray drying, superheated steam drying and/or combinations thereof to obtain a protein-fibre concentrate wherein the total content of protein and indigenous fibre is at least 30 wt %, based on total dry weight of the concentrate In an embodiment, step h) as defined herein is replaced by subjecting the third solid fraction obtained in step g) to a technique chosen from the group consisting of vacuum drying, spray drying, convective drying, superheated steam drying and/or combinations thereof to obtain a protein-fibre concentrate wherein the total content of protein and indigenous fibre is at least 30 wt %, based on total dry weight of the concentrate.

The plant material comprising between 10 and 50 wt % on dry weight basis of proteins is preferably selected from the group consisting of vegetables, fruits, seeds, legumes, grains and combinations thereof. In a preferred embodiment, the plant material comprising between 10 and 50 wt % on dry weight basis of proteins is raw plant material, which means that it is crude, unprocessed plant material. In a more preferred embodiment, the plant material comprising between 10 and 50 wt % on dry weight basis of proteins is selected from the group consisting of oilseeds, including rapeseed, canola, sunflower, safflower, and cottonseed, pulses, including soybeans and other beans, legumes and peas, including chickpea, red, green, yellow and brown lentils, and combinations thereof. In a more preferred embodiment, the plant material comprising between 10 and 50 wt % on dry weight basis of proteins is selected from the group consisting of oilseeds including rapeseed, canola, sunflower seed, flaxseed, safflower seed, cottonseed, and combinations thereof, wherein the plant material preferably is rapeseed, soybean, or sunflower.

Raw plant materials such as oilseeds like rapeseed, canola, sunflower, safflower, cottonseed, et cetera, pulses such as soybeans and other beans, legumes and peas such as chickpea, red, green, yellow and brown lentils, et cetera, share the common feature that a significant fraction of their native protein content belongs to the protein class called albumins and/or globulins, i.e. they are soluble in water and/or aqueous solutions of inorganic salts containing cations like $NH^{4+}$, $Li^+$, $Na^+$, $K^+$, $Mg^{2+}$, $Ca^{2+}$ and/or anions like $Cl^-$, $SO4^{2-}$, $SO3^{2-}$, $HSO3^-$, et cetera. Besides proteins, these raw plant materials typically also contain other types of compounds which are present in varying proportions depending on the type of plant material. Said other compounds typically are saccharides (poly-, oligo-, mono-), starch, phytates, phenolic compounds, fibrous components, non-protein nitrogen compounds, et cetera. One notable and distinct class of ingredients that may be present in the raw plant materials encompasses lipids such as fats, oils, phospholipids, glycolipids, et cetera, characterized by the common feature of having a non-polar part in their molecular structure composed of fatty acids having a number of carbon atoms within a range from 4 to 28.

The person skilled in art will understand that prior to processing according to the teaching of invention, raw plant material in the form of whole seeds, beans or grains may be subjected to preselection and/or dry fractionation like dehulling (i.e. removal of pods and outer coats of seeds). Such an operation may be particularly advantageous in case the protein content in the parts that can be removed by dry fractionation is significantly lower than the protein content in the parts that will be subjected to further processing with the aim of obtaining protein products.

Hence, in a preferred embodiment, the process as defined hereinbefore, wherein, in particular if the raw plant material comprises whole seeds, beans or grains, the plant material prior to step a) is at least partially depleted of protein-lean and lignin-rich outer layer having a form of coat, bark, husk, hull etcetera, preferably using suitable method of dehulling, decortication, dry fractionation or a combination thereof.

Typically, for oilseeds and soya, part of the fat, oil and lipids present in the raw plant material may be extracted from the raw plant material by mechanical means such as extrusion or cold pressing to produce oilseed cakes, or said fat, oil and lipids can be extracted by chemical means such as extraction in apolar and lipophilic solvents such as hexane. In conventional processes wherein hexane extraction is employed, steam and high temperatures are typically employed to remove residuals of hexane from the meal in a purposely designed desolventizer/toasting step. Such a treatment may have a negative impact on the quality of protein in the meal due to partial and irreversible denaturation of the protein present in the meal and loss of relevant functional properties, such as solubility and/or the ability to form stable emulsions with lipids.

In a preferred embodiment, the plant material is at least partially defatted prior to step a) using mechanical means, preferably using cold pressing. Preferably, neither organic nor mineral solvents are used in the defatting step using mechanical means.

The advantages of the process as defined hereinbefore are most pronounced if the raw plant material contains considerable amounts of fats, oils and/or lipids. Hence, in a preferred embodiment, the raw plant material comprises at least 5 wt %, more preferably at least 10 wt %, even more preferably at least 15 wt %, on dry weight basis of fats, oils and lipids.

In a very preferred embodiment, the raw plant material is not heated to temperatures higher than 75° C.

As indicated, crushing or comminuting of the raw plant material is performed. This is a necessary step to facilitate distribution and suspension of the plant material in the first aqueous solvent used for extraction. By doing so, the conditions for effective mass transfer between crushed or comminuted raw plant material and the first solvent used for extraction are facilitated.

In a preferred embodiment, the first solvent in step b) is water or an aqueous solution comprising salts and optionally comprising further additives.

Extracting water-soluble components from the crushed or comminuted raw plant material to the first solvent may be accomplished by any technique suitable for facilitating mass transfer between the suspended or dispersed solid phase and the continuous liquid phase of the first solvent such as:
  i) mixing in a STR;
  ii) contacting the crushed or comminuted raw plant material, being immobilized as a packed bed, with a first solvent percolating through the packed bed;
  iii) contacting the crushed or comminuted raw plant material by suspending it in an upward flowing first solvent; or
  iv) contacting the crushed or comminuted raw plant material with the first solvent by allowing the material to settle in the first solvent due to the action of forces of gravity and/or centrifugal forces.

The person skilled in the art appreciates that all these means and mechanisms of contacting crushed or comminuted raw plant material with the first solvent can be divided into two distinct classes characterized by the amount of shear that is generated in the contacting device. In the low shear mode of operation, like in a packed bed, an expanded bed or a fluidized bed, or during gravitational settling, shear forces and velocity gradients in the contacting devices are on such a low level that the integrity of the crushed or comminuted raw plant material is substantially preserved and mass transfer between crushed or comminuted raw plant material and first solvent is governed mainly by diffusion of soluble components from the crushed or comminuted raw plant material into the stagnant or gently flowing first solvent, while nonsoluble components like fibres and lipids are mainly left intact and are arrested in the solid matrix. In contrast, when a high shear mode of operation is employed, like in an STR, where shear rates due to agitation may well exceed 100 l/s, especially in the vicinity of the agitator, integrity of the crushed or comminuted raw plant material will generally not be preserved, due to disruptive effects of velocity gradients and or turbulence generated by the stirring device. In effect, particles of the crushed or comminuted raw plant material may become subjected to fragmentation with subsequent release of the constituent components like fines and lipids into the liquid phase. Release of these fines and lipids may have negative impact on the process further downstream of the extraction step. Coextraction of proteins and lipids in the high-shear devices may also lead to formation of micro-emulsions wherein proteins, lipids, solid fines and anti-nutritional factors will become entrapped in grease-like amorphous bodies, posing severe problems for the processor and making the process of fractionation, purification and isolation of protein unfeasible. Hence, in a preferred embodiment, the extraction of water-soluble components in step b) is performed under low-shear conditions.

The extraction of soluble components from crushed or comminuted raw plant material suspended or dispersed in the first solvent can be conducted in a batch-wise, semi-continuous or fully continuous mode of operation. Given sufficient amount of contacting time, typically 1-8 h, more preferably 2-6 h, a significant portion of soluble components will be released from the crushed or comminuted plant material and will dissolve into the first solvent, yielding the first liquid fraction (also called 'crude extract') and the first solid fraction containing residual material, including the protein-fibre matrix that has not been solubilized.

In a preferred embodiment, the separation of the first liquid fraction from the first solid fraction in step c) is performed using a technique chosen from the group consisting of centrifugation, sedimentation, filtration and/or combinations thereof.

The second solvent that is added to the solid fraction obtained in step d) comprises at least 60 wt % of an alcohol having 1 to 5 carbon atoms which is miscible with water at room temperature, based on the total weight of the second solvent. In a preferred embodiment, the alcohol having 1 to 5 carbon atoms which is miscible with water at room temperature has a relative polarity between 0.8 and 0.4. Values of relative polarity for various solvents are disclosed in: Solvents and Solvent Effects in Organic Chemistry, Wiley-VCH Publishers, 3rd ed., 2003, which is incorporated herein by reference. Water has a relative polarity of 1. In a more preferred embodiment, the alcohol having 1 to 5 carbon atoms which is miscible with water at room temperature is chosen from the group consisting of methanol, ethanol, propanol, iso-propanol, butanol, iso-butanol, and combinations thereof.

Addition of the second solvent to the first solid fraction will have an effect on the polarity of the liquid phase and may alter, e.g., the nature of interactions between protein-fibre matrix and other components and impurities such as saccharides, phenolic compounds and/or isoflavones in such a way that these impurities can dissociate from the protein-fibre matrix and can be removed from the protein-fibre matrix in subsequent solid-liquid separation steps. Thus, the addition of the second solvent and the replacement of the first solvent may facilitate efficient purification of the protein-fibre matrix from impurities otherwise associated with said protein-fibre matrix in its native form, which impurities are not amenable to removal while protein-fibre matrix is in the first (aqueous) solvent.

As the object of the invention is the provision of protein-fibre concentrates for application in human food, the choice of suitable second solvents is dictated by functionality as well as by health and safety concerns. Due to the above-mentioned constraints, the most preferred choice of the alcohol having 1 to 5 carbon atoms which is miscible with water at room temperature is ethanol.

Ethanol is commonly used in the food industry and is recognized as a GRAS solvent. The amount of the second solvent used in step d) of the process will be dictated by the degree of concentration of the protein in the first solvent, the solubility of the protein in the mixture of the first solvent and the second solvent and by denaturation effects related to the second solvent. In a preferred embodiment, the amount of second solvent will be such as to reach a weight ratio of the first solvent used in step b) to the second solvent used in step d) is between 1:10 and 1:1, preferably between 1:3 and 2:3. After the addition of the second solvent, a mixture is created wherein protein-fibre is mainly present as a precipitated solid fraction and wherein soluble compounds such as saccharides, phenolic compounds, isoflavones and other impurities are found in the liquid phase. Fats and lipids, if present, will be mainly associated with the solid fraction.

The solid fraction is isolated in step e) from the mixture using a technique chosen from the group consisting of filtration, sedimentation, centrifugation and combinations thereof, to obtain a second solid fraction and a second liquid fraction. As will be appreciated by the skilled person, the second solid fraction comprises traces of solvents used in the process such as water and the water-miscible alcohol. The second solid fraction may also contain residues of fats and lipids that were not removed in other steps of the process.

The person skilled in art will further understand that after isolation of the second solid fraction, in order to further improve purity of the protein product, additional washing steps can be employed, whereby fresh portions of the second solvent can be added to the second solid fraction, followed by suitable solid-liquid separation steps chosen from the group consisting of filtration, sedimentation, centrifugation and combinations thereof.

The third solvent added in step f) comprises at least 90 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is preferably chosen such that the overall liquid phase does not separate into distinct liquid phases. In a preferred embodiment, the amount of third solvent will be such as to reach a weight ratio of the second solvent to the third solvent between 1:10 and 1:1, preferably between 1:5 and 1:2. Addition of the third solvent will have an effect on polarity of the liquid phase and will alter the solubility of oils, fats and lipids and may also alter the nature of interactions between protein-fibres and non-polar impurities in such way that they can dissociate from protein-fibres and can be removed in subsequent solid-liquid separation steps. Thus, the addition of the third solvent and the replacement of the first and the second solvent facilitates efficient purification of the protein-fibre matrix from impurities otherwise associated with said protein-fibre matrix in its native form which impurities are not amenable to removal, while the protein-fibre matrix is present in the first and/or second solvent.

In a preferred embodiment, the apolar and lipophilic organic ester having up to 5 carbon atoms that is at least partially miscible with the first solvent and fully miscible with the second solvent at room temperature has a relative polarity of less than 0.4.

As the object of the invention is the provision of protein-fibre concentrates for application in human food, the choice of the suitable third solvent is dictated by functionality as well as by health and safety concerns. Due to these constraints, the most preferred choice of this apolar solvent is ethyl acetate. Ethyl acetate in commonly used in the food industry and is recognized as a GRAS solvent. In a preferred embodiment, the apolar and lipophilic organic ester having up to 5 carbon atoms in the third solvent used in step g) is ethyl acetate.

The solid-liquid mixture obtained in step f) is separated into a third liquid fraction and a third solid fraction using filtration, sedimentation or centrifugation. Due to removal of lipids and other apolar impurities by the action of the third solvent, the purity of the protein-fibre matrix is further improved and, consequently, the protein and indigenous fibre content of the fourth solid fraction exceeds 30 wt %, based on total dry weight of the fourth solid fraction.

The person skilled in the art will understand that after isolation of the third solid fraction, in order to further improve purity and or to further remove residues of the first and second solvents from the third solid fraction, additional washing steps can be employed, whereby fresh portions of the third solvent can be added to the third solid fraction, followed by suitable solid-liquid separation steps chosen from the group consisting of filtration, sedimentation, centrifugation and combinations thereof.

The third solid fraction, which is protein-fibre concentrate soaked in the third solvent, is subjected in step h) to a technique chosen from the group consisting of vacuum drying, spray drying, superheated steam drying and combinations thereof, to obtain a protein-fibre concentrate wherein the content of protein and fibre combined is at least 90 wt %, based on total dry weight of the protein-fibre concentrate.

In a preferred embodiment, the residual amount of the third solvent in the protein-fibre concentrate obtained in step h) is below the acceptable level required by food authorities, typically below 1000 ppm, preferably below 100 ppm, even more preferably below 30 ppm.

An advantage of using the third solvent as defined hereinbefore, such as ethyl acetate, is its high volatility and low latent heat of evaporation (368 kJ/kg), which is significantly lower than that of water (2260 kJ/kg) and ethanol (841 kJ/kg), which implies that a lower amount of energy will be required to remove residues of solvents used in the process and that temperatures to which the protein is exposed during drying can be lowered as compared to the processes where only a first solvent or a second solvent or a combination thereof is used. Proteins are known to be sensitive to the effects of high temperatures and can, for example, be severely denaturized during spray drying. As an example, it is reported that up to 70% of whey protein may be denatured during spray drying. In this respect, reference is made to Md. Amdadul Hague, 2015, *Drying and Denaturation of Proteins in Spray Drying Process*, https://www.researchgate.net/publication/275100415.

Yet another advantage of replacing the first and second solvent with the third solvent is the low degree of denaturation of plant proteins in the apolar, lipophilic solvents such as esters like ethyl acetate, even at high temperatures. In this respect, reference is made to D. Fukushima, 1969, *Denaturation of soy proteins by organic solvents*, www.aaccnet.org/publications/cc/backissues/1969/Documents/Chem-46_156.pdf.

The use of lipophilic GRAS solvents, such as ethyl acetate, to remove residues of fats and lipids from protein-containing materials brings additional advantage in that it makes the use of noxious solvents derived from mineral oils such as hexane obsolete in the process of producing food grade protein products from plant material, such as oilseeds. This also implies elimination of conventional steps that are currently employed by the industry to remove residues of hexane from the meals, said steps typically involving use of steam and high temperatures, which steps significantly limit the extractability and functionality of the proteins present in the meal.

In a very preferred embodiment, the solvents used in the process as defined hereinbefore substantially consist of GRAS solvents. In another very preferred embodiment, the process as defined hereinbefore is performed without using organic or mineral solvents having 6 or more carbon atoms, such as hexane.

The process of the invention does not require the use of extreme conditions such as high temperatures or major shifts of the pH. Rather to the contrary, temperatures to which the proteins are exposed throughout the process are preferably kept in the range between 0 to 70° C., more preferably between 0 to 55° C., more preferably between 4 to 50° C., more preferably between 4 to 20° C., most preferably between 10 to 20° C., and the pH is preferably kept in the range between 5 and 8.

In a preferred embodiment, a process according to the invention is provided, wherein the first solid fraction after step c) and before step d) is subjected to an additional washing step using first solvent performed at a pH between 2 and 12 followed by a solid-liquid separation step.

A person skilled in in art will appreciate that conducting additional washing step at low pH between pH 3-5 might be helpful to wash-out anti-nutritional factors which are soluble in acidic solutions like phytates, while keeping a proteinaceous fraction in insoluble state.

A person skilled in art will also appreciate that conducting additional washing step at high, basic pH might be helpful in some applications of the process to wash-out components that are soluble in basic solutions such as proteins and lipids, while leaving fibrous components of the matrix intact.

In a preferred embodiment, a process according to the invention is provided, wherein the first solid fraction after step e) and before step f) is subjected to an additional washing step using second solvent followed by a solid-liquid separation step.

In a preferred embodiment, a process according to the invention is provided, wherein the third solid fraction after step g) and before step h) is subjected to an additional washing step using the third solvent followed by a solid-liquid separation step.

In a preferred embodiment, the protein-fibre concentrate obtained in step h) of the process as defined hereinbefore comprises at least 30 wt % of indigenous protein and indigenous fibre based on dry matter.

In a preferred embodiment, the protein-fibre concentrate obtained in step h) of the process as defined herein comprises at least 30 wt % of indigenous protein and indigenous fibre based on dry matter, less than 1 wt % carbohydrates (simple sugars) based on dry matter, less than 0.1 wt % phenolic compounds based on dry matter and no organic solvents or mineral solvents having 6 or more carbon atoms.

In another preferred embodiment, the protein-fibre concentrate obtained in step h) of the process as defined herein comprises at least 30 wt % of indigenous protein and indigenous fibre based on dry matter, less than 1 wt % carbohydrates (simple sugars) based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms.

In another preferred embodiment, the protein-fibre concentrate obtained in step h) of the process as defined herein comprises at least 30 wt % of indigenous protein, at least 10 wt %, more preferably at least 20 wt %, even more preferably at least 30 wt %, still more preferably at least 50 wt % of indigenous fibre based on dry matter, less than 1 wt % carbohydrates based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms.

In yet another preferred embodiment, the protein-fibre concentrate obtained in step h) of the process as defined herein comprises at least 30 wt % of indigenous protein and indigenous fibre based on dry matter, less than 1 wt % carbohydrates (simple sugars) based on dry matter, less than 0.1 wt % phenolic compounds based on dry matter and no organic solvents or mineral solvents having 6 or more carbon atoms and has an emulsifying activity (EA) of at least 30%, more preferably of at least 40%.

In another preferred embodiment, the protein-fibre concentrate obtained in step h) of the process as defined herein comprises at least 30 wt % of indigenous protein, at least 10 wt %, more preferably at least 20 wt %, even more preferably at least 30 wt %, still more preferably at least 50 wt % of indigenous fibre based on dry matter, less than 1 wt % carbohydrates (simple sugars) based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms and has an EA of at least 30%, more preferably of at least 40%.

Now that the invention provides a process for preparing a protein-fibre concentrate with properties as described above, in one aspect the invention provides a protein-fibre concentrate comprising at least 30 wt % of indigenous protein and indigenous fibre based on dry matter, and no organic solvents or mineral solvents having 6 or more carbon atoms, the protein-fibre concentrate preferably being obtainable by a process according to the invention.

In another aspect, the invention provides a protein-fibre concentrate obtainable by a process according to the invention.

A protein-fibre concentrate according to the invention preferably comprises less than 4 wt % of fats, oils and lipids, based on dry matter. Preferably, the protein-fibre concentrate according to the invention exhibits a water absorption capacity of at least 3 g/g and fat absorption capacity of at least 1 g/g.

In particular for a protein-fibre concentrate from rapeseed cake according to the invention, it is more preferred that it comprises less than 1 wt % of fats, oils and lipids, based on dry matter. It is particularly preferred that the protein-fibre concentrate from rapeseed cake according to the invention exhibits a water absorption capacity of at least 5 g/g, more preferably at least 7 g/g, most preferably at least 9 g/g, and fat absorption capacity of at least 5 g/g, more preferably at least 6 g/g.

A protein-fibre concentrate according to the invention preferably exhibits emulsifying activity of between 30-70%, more preferably between 40-55% and emulsifying stability of at least 60%, more preferably at least 70%, most preferably at least 80%.

In a preferred embodiment, the protein-fibre concentrate as defined herein or obtainable by the process defined herein comprises at least 30 wt % of indigenous protein and indigenous fibre based on dry matter, less than 1 wt % carbohydrates (simple sugars) based on dry matter, less than 0.1 wt % phenolic compounds based on dry matter and no organic solvents or mineral solvents having 6 or more carbon atoms.

In a preferred embodiment, the protein-fibre concentrate as defined herein or obtainable by the process defined herein comprises at least 30 wt % of indigenous protein and indigenous fibre based on dry matter, less than 1 wt % carbohydrates (simple sugars) based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms.

In another preferred embodiment, the protein-fibre concentrate as defined herein or obtainable by the process defined herein comprises at least 30 wt % of indigenous protein, at least 10 wt %, more preferably at least 20 wt %, even more preferably at least 30 wt %, still more preferably at least 50 wt % of indigenous fibre based on dry matter, less than 1 wt % carbohydrates (simple sugars) based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms.

In yet another preferred embodiment, the protein-fibre concentrate as defined herein or obtainable by the process defined herein comprises at least 30 wt % of indigenous protein and indigenous fibre based on dry matter, less than 1 wt % carbohydrates based on dry matter, less than 0.1 wt % phenolic compounds based on dry matter and no organic solvents or mineral solvents having 6 or more carbon atoms and has an EA of at least 30%, more preferably of at least 40%.

In another preferred embodiment, the protein-fibre concentrate as defined herein or obtainable by the process defined herein comprises at least 30 wt % of indigenous protein, at least 10 wt %, more preferably at least 20 wt %, even more preferably at least 30 wt %, still more preferably at least 50 wt % of indigenous fibre based on dry matter, less than 1 wt % carbohydrates (simple sugars) based on dry matter, less than 0.1 wt % phenolic compounds based on dry matter, less than 4 wt %, preferably less than 2 wt %, of fats oils and lipids based on dry matter and no organic solvents or mineral solvents having 6 or more carbon atoms and has an EA of at least 30%, more preferably of at least 40%.

As already described above, the process for obtaining a protein-fibre concentrate according to the invention has been optimized for use in food, inter alia because of the choice of solvents. Therefore, the invention further provides a use of the protein-fibre concentrate according to the invention in food.

The invention has been described by reference to certain embodiments discussed above. It will be recognized that these embodiments are susceptible to various modifications and alternative forms well known to those of skilled in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Example 1

The aim of the experiments in Example 1 was to generate samples of fibre-protein concentrates from 3 different oilseeds: soybeans (Example 1a), sunflower cake (Example 1b) and rapeseed cake (Example 1c), in accordance with the process of invention.

Figure 1:
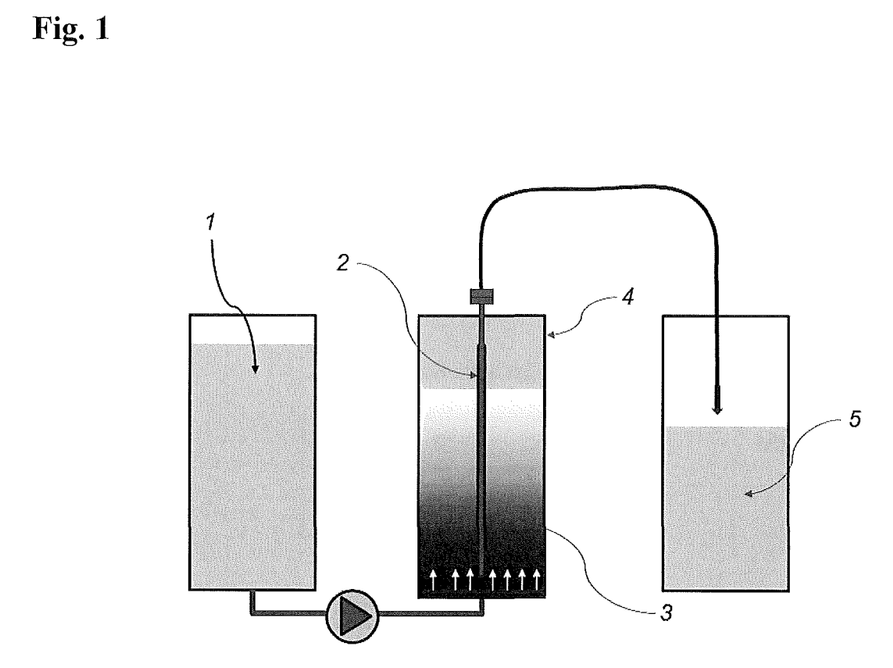
FIG. 1 depicts a schematic drawing of the ALSEOS 7 L system used in the Examples 1a and 1b, wherein (1) represents the first solvent, (2) represents a cylindrical filter element, 100 micrometer wiremesh, filter area 0.1 m$^2$, (3) represents the comminuted source material, (4) represents the ALSEOS column, ID 0.1 m, H 1 m, and (5) represents the filtrate (=crude extract, =first liquid fraction). In Example 1c the ALSEOS column had dimensions: ID 0.2 m, H 1 m and the filter element (2) had a shape of two-sided rectangular frame 0.18×0.85 m and filter area of 0.3 m$^2$.
Figure 2:
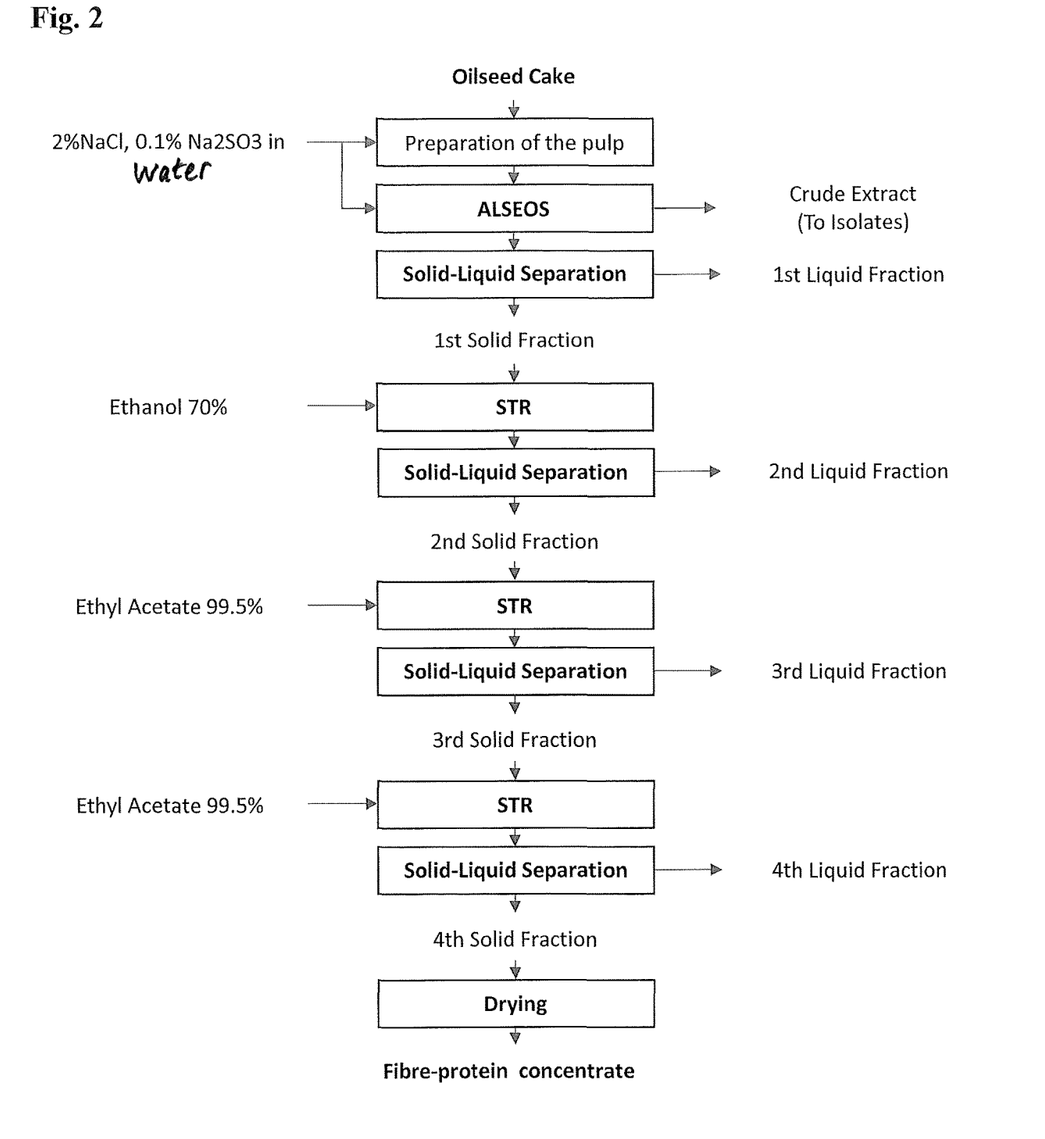
FIG. 2 depicts a schematic diagram of the process of the invention as described in the Examples.

A schematic representation of the process is shown in FIG. 1 and the set points for process parameters are given in the section: 'Details of the process'.

Details of the Process

The process includes 9 process steps, as described below. Important parameters and process information regarding these steps are summarized below.

1. Preparation of the Pulp.

Pulp is prepared in a separate vessel where comminuted oilseed cake (rapeseed, sunflower) or raw plant material (soybeans) is blended with extraction medium with the ratio 1:4 (w/w) with minimum effort required to make the pulp homogeneous.

2. Extraction in ALSEOS Device

A schematic drawing of the ALSEOS 7 L system is given in FIG. 1. The working principles of ALSEOS device are explained in WO2016/093698A2, which is herein incorporated by reference.

ALSEOS 7 L (==Column Volume 7 L) was used in 1a (soybeans) and 1b (sunflower cake)

ALSEOS 30 L (==Column volume 30 L) was used in 1c (rapeseed cake)

ALSEOS device is charged (up to 1CV=100% of working volume) with the pulp prepared in (1). Fresh extraction medium is supplied via flow distributor at the bottom of the ALSEOS column and the Crude Extract is collected on the filtrate side after passing filtering device positioned vertically in the column. Solid residue retained in the column is then further processed to fibre-protein concentrate. Details of the extraction step are given below and in Table 1.
  a) Extraction medium: 2% NaCl, 0.1% $Na_2SO_3$
  b) Temperature: 15° C.
  c) pH of extraction: native (pH between 5-6.5)
  d) Target volume of the extract: >1CV (==>7 L for ALSEOS 7 used in 1a and 1b and >30 L for ALSEOS 30 L used in 1c)
  e) medium flow rate range: 0.25-0.5CV/h 3. Solid-Liquid Separation by Centrifugation
  a) Time: 30 min
  b) Temperature: 4° C.
  c) Relative centrifugal force: 4000 G 4. EtOH Step in STR (Stirred Tank Reactor)
  a) 70% EtOH (vol/vol) added in quantity 5 times mass of the pellet obtained in step 3.
  b) dosing time—10 min
  c) incubation time—10 min 5. Solid-Liquid Separation by Centrifugation
  a) Time: 30 min
  b) Temperature: 4° C.
  c) Relative centrifugal force: 4000 G 6. Ethyl Acetate Step 1 in STR (Stirred Tank Reactor)
  a) Ethyl acetate (99.5% purity) added in quantity 5 times mass of the wet pellet obtained in step 5.
  b) dosing time—fast, one dose
  c) incubation time—30 min 7. Solid-Liquid Separation by Centrifugation
  a) Time: 30 min
  b) Temperature: 4° C.
  c) Relative centrifugal force: 4000 G 8. Ethyl acetate step 2
  a) Ethyl acetate—5× wet protein precipitate after ethyl acetate step 7
  b) dosing time—fast, one dose
  c) incubation time—30 min 9. Solid-Liquid Separation by Centrifugation
  a) Time: 30 min
  b) Temperature: 4° C.
  c) Relative centrifugal force: 4000 G 10. Drying in Vacuum Tray Dryer
  a) Time: 24-48 h
  b) Temperature: 50° C.
  c) Pressure in the vacuum dryer: 10 mbar

TABLE 1

Parameters of the extraction step in ALSEOS column

| process parameters | ID46 Starting material: soybeans | ID48 Starting material: sunflower cake | ID91 Starting material: rapeseed cake |
|---|---|---|---|
| amount of starting material [kg] | 1.4 | 1.4 | 6.0 |
| pH of the suspension | 6.31 | 6.34 | 5.79 |
| extraction time [min] | 337 | 250 | 240 |
| amount of the crude extract [L] | 10.6 | 14.2 | 32.3 |
| amount of the crude extract [CV, column volume] | 1.5 | 2.0 | 1.1 |
| pH of the crude extract | 6.4-6.7 | 6.6-6.7 | 5.9-6.0 |
| comments | 100% of first solid fraction was processed to protein-fibre concentrates | ca. 30% of first solid fraction was processed to protein-fibre concentrates. | ca. 30% of first solid fraction was processed to protein-fibre concentrates. |

The first solid fraction after extraction was processed to protein-fibre concentrate according to the process of invention (steps 2-10 above), to yield following amounts of protein-fibre concentrates:

351 g from soybeans
103 g from rapeseed cake
220 g from rapeseed cake

Results of Analytical Testing

Analytical testing was performed according to the methods as described in 'Methods used to characterize the raw plant material and protein-fibre concentrates'.

The characteristics of the protein-fibre concentrates, including physicochemical and functional properties, is given in Table 2.

TABLE 2

Physicochemical and functional characteristics of protein-fibre concentrates

| Quality Attribute | ID Sample number | ID 46 F-46#22 protein-fibre concentrate from soybeans | ID48 F-48#20 protein-fibre concentrate from sunflower cake | ID91 I-91#13 protein-fibre concentrate from rapeseed cake |
|---|---|---|---|---|
| Dry weight | % | 95 | 93 | 93 |
| Protein (Kjeldahl 6.25xN) | % DW | 40 | 49 | 32 |
| Fat (Soxhlet method) | % DW | 3.8 | 3.4 | 0.4 |
| Phenolic compounds | % DW | 0.028 | 0.078 | 0.015 |
| Phytates | % DW | 1.11 | — | 1.11 |
| Carbohydrates (simple sugars) | % DW | — | — | 0.35 |
| Ethanol | % | 0.0533 | 0.0025 | 0.0571 |
| Ethyl Acetate | ppm | 3.61 | <2.2 (<LOQ) | 25.49 |
| Emulsifying Activity (EA) | % | 47 | 52 | 41 |
| Emulsifying Stability (ES) | % | 98 | 95 | 82 |
| Water Absorption Capacity (WAC) | [g water/ g sample] | 3.69 | 3.75 | 9.37 |
| Oil Absorption Capacity (OAC) | [g oil/ g sample] | 1.43 | 1.54 | 6.49 |

The key equipment used in examples is given in Table 3.

TABLE 3

Key equipment used in examples

| Equipment | Type |
|---|---|
| ALSEOS 7L | Prototype extraction system with a filter 100 μm mesh size and 7 L working volume - used for soya and sunflower |
| ALSEOS 30L | Prototype extraction system with a filter 100 μm mesh size and 30 L working volume - used for rapeseed |
| Grinder | Philips hr2098/30 |
| Peristaltic pump | Lead Fluid BT 300S + Y15 |
| pH-meter | Mettler Toledo Seven Compact, pH/Ion S 220 |
| Conductivity meter | FiveGo ™ conductivity meter F3 Mettler Toledo |
| Magnetic stirrer | IKA C-MAG HS 7 |
| Centrifuge | Thermo Scientific Heraeus Multifuge X3 FR |
| Centrifuge | Hetticha 420R |

Characteristics of the source plant material: raw plant material (soybeans) and cake (sunflower, rapeseed) used in examples is given in Table 4.

TABLE 4

Characteristics of the source plant material: raw plant material (soybeans) and cake (sunflower, rapeseed) used in examples

| | Data | | | |
|---|---|---|---|---|
| Parameter | soybeans | sunflower cake | rapeseed cake | Units |
| Dry weight (DW) | 93 | 93 | 93 | % |
| Protein (Kjeldahl 6.25xN) | 40 | 32 | 31 | % DW |
| Fat (Soxhlet method) | 22 | 16 | 25 | % DW |
| Phenolic compounds | 0.103 | 0.592 | 0.571 | % DW |
| Phytates | 1.27 | 2.76 | 2.57 | % DW |
| Carbohydrates (simple sugars) | 0.69 | 0.62 | 11.12 | % DW |
| NS % (Nitrogen Solubility) | 25 | 36 | 38 | % |

The process described was capable to generate protein-fibre concentrates from different source materials of plant origin. For all obtained protein-fibre concentrates, the functional parameters ES and EA are at a high level. Rapeseed concentrate positively distinguishes itself with a high level of Water Absorption Capacity (WAC=6.23 g water/g sample) and Oil Absorption Capacity (OAC=3.24 g oil/g sample).

Example 2

In Example 2, fibre-protein concentrates from 2 different oilseeds were produced, namely rapeseed and soybeans.

Starting material for the processes were produced as follows. Raw material was milled and sieved in order to obtain 2.5 kg of rapeseed cake and 2 kg of soybeans. The milled material was sieved to obtain fractions with a particle size below 1 mm, which fraction was further processed.

Milled and sieved rapeseed cake is referred to as starting material 'R' in what follows. Likewise, milled and sieved soybeans is referred to as starting material 'S' in what follows.

Subsequently, 1.5 kg of rapeseed cake and 1 kg of soybeans (milled and sieved) were individually degreased with hexane. For rapeseed, 1.5 kg of milled and sieved rapeseed cake was mixed with 4.5 L (2970 g) of hexane in a beaker on a mechanical stirrer (first with an anchor mixing element on 100 rpm and after 3 washes with a propeller mixing element on 250 rpm) for 0.5 h. After that, the resulting suspension was centrifuged (4000 G, 30 min, 22° C.). The supernatant was poured into a separate container and the remaining residue was mixed with 4.5 L of hexane. The same procedure was applied and repeated 12 times until the obtained supernatant became transparent, indicating that (sufficient) fat had been removed from the material. After decanting in the centrifuge, the residue was vacuum dried for 20-22 h at 40° C. and 100 mbar. In a subsequent step, the residue was divided in half and one part of it was toasted (steamed) for 1 h at 90±2° C. and dried again. The thus obtained sample is referred to as starting material R+H+T in what follows.

Likewise, 1 kg of milled and sieved soybeans was mixed with 3 L (1980 g) of hexane and processed it the same way. The only difference with the process for the production of R+H+T was the use of 200 rpm during mechanical stirring and a total of washing steps of 9. The thus obtained sample is referred to as starting material S+H+T in what follows.

The pH of the starting materials was determined as 5.74, 5.78, 6.45 and 6.38 for R, R+T+H, S and S+T+H, respectively. At these pH's, the proteins are in their native states.

Starting materials R, S, R+T+H and S+T+H were subjected to the same subsequent process steps in order to obtain protein-fibre concentrates.

The further process comprised 10 steps. Unless specified otherwise, the key equipment used was similar to that used in Example 1 (Table 3). An extraction step was conducted in a STR (Stirred Tank Reactor) device by suspending each starting material in an extraction medium and by subjecting the resulting mixture to vigorous mixing with a mechanical stirrer. The suspension was subsequently centrifuged, the supernatant was discarded and the remaining residue was mixed with 70% EtOH with a blender and again centrifuged. The resulting supernatant was poured out and the remaining residue was mixed with ethyl acetate with a blender and subsequently centrifuged. The resulting supernatant was poured into a separate container (for further distillation) and the residue was vacuum pre-dried, milled, sieved and vacuum dried again.

The processes performed with starting materials R, R+T+H, S and S+T+H are referred to as run 2a, 2b, 2c and 2d, respectively. Runs 2a and 2c are according to the invention. All of the process parameters were summarized below.

1. Extraction in an STR Device
   a) The raw materials were blended with extraction medium in a ratio 1:4 (w/w) and extracted in an STR
   b) Extraction medium: 0.9% NaCl, 0.1% $Na_2SO_3$, 0.1% EtOH 96%, 0.1% E211
   c) Medium temperature: 15° C.
   d) Amount of medium used for suspension: 4× starting material [weight by weight]
   e) Suspending time: 10 min
   f) pH @ extraction: native, afterwards adjusted to pH value: 4.0
   g) Mixing speed: 200-350 rpm
   h) Mixing time: 30 min
2. Solid-Liquid Separation by Centrifugation
   a) Time: 20 min
   b) Temperature: 22° C.
   c) Relative centrifugal force: 4000 G
3. EtOH Step in an STR Device
   a) 70% EtOH: 5× wet residue [weight by weight]
   b) dosing time: fast, one dose
   c) mixing time: 1 min
4. Solid-Liquid Separation by Centrifugation
   a) Time: 20 min
   b) Temperature: 22° C.
   c) Relative centrifugal force: 4000 G
5. Ethyl Acetate Step
   a) Ethyl acetate—5× wet residue [weight by weight]
   b) dosing time—fast, one dose
   c) mixing time: 1 min
6. Solid-Liquid Separation by Centrifugation
   a) Time: 20 min
   b) Temperature: 22° C.
   c) Relative centrifugal force: 4000 G
7. Pre-Drying
   a) Pre-drying time: 20-22 h
   b) Pre-drying temperature: 40° C.
   c) Pre-drying pressure: 100 mbar
8. Milling
   a) Pestle position: 1-8
   b) Time: 5 min
   c) Number of repetitions in the cycle: 2-9
9. Sieving
   a) Amplitude: 2 mm
   b) Time: 3 min
   c) Mesh: 150 μm
   d) Interval time: 10 s
10. Drying
    a) Time: 72 h
    b) Temperature: 70° C.
    c) Pressure in the vacuum dryer: below 100 mbar The properties of starting materials R, R+T+H, S and S+T+H are listed in Table 5. The properties of the protein-fibre concentrates resulting after runs 2a, 2b, 2c and 2d are listed in Table 6.

TABLE 5 properties of starting materials R, R + T + H, S and S + T + H

| Parameter [unit] | Dry matter content [wt %] | Protein content [dry wt %] | Fat content [dry wt %] | Phenolic compound content [dry wt %] | Phytate content [dry wt %] | NS [%] |
|---|---|---|---|---|---|---|
| R | 93.98 | 30.94 | 20.39 | 2.78 | 2.78 | 59.09 |
| R + T + H | 99.67 | 38.99 | 1.58 | 3.44 | 3.44 | 33.74 |
| S | 93.19 | 34.99 | 20.45 | 1.53 | 1.53 | 30.46 |
| S + T + H | 99.74 | 45.64 | 3.01 | 0.18 | 1.98 | 13.59 |

TABLE 6 properties of the protein-fibre concentrates resulting after runs 2a, 2b, 2c and 2d

| Parameter Units | Dry matter content [wt %] | Protein content [dry wt %] | Fat content [dry wt %] | Phenolic compound content [dry wt %] | Phytate content [dry wt %] | Ash [dry wt %] | Carbohydrate content (simple sugars) [dry wt %] |
|---|---|---|---|---|---|---|---|
| 2a | 97.35 | 50.54 | 1.37 | 0.21 | 2.88 | 5.21 | 1.31 |
| 2b | 97.80 | 57.82 | <0.10 | 0.23 | 2.65 | — | 1.48 |
| 2c | 99.07 | 52.17 | 6.37 | 0.12 | 1.74 | 3.49 | 1.92 |
| 2d | 98.39 | 54.66 | 0.68 | 0.10 | 1.52 | — | 1.60 |

| Parameter Units | Total fibre [dry wt %] | Ethanol [wt %] | Ethyl acetate [ppm] | Emulsifying activity (EA) [%] | WAC/OAC [g water or oil/g sample] | NS [%] |
|---|---|---|---|---|---|---|
| 2a | 37.34 | N.D.[a] | N.D.[a] | 45.83 | 4.53/1.44 | 22.23 |
| 2b | — | 0.09 | <2.0 | 5.00 | 3.08/1.47 | 5.31 |
| 2c | 37.59 | N.D.[a] | N.D.[a] | 6.67 | 2.98/1.40 | 10.97 |
| 2d | — | 0.09 | <2.0 | 3.33 | 3.22/1.27 | 9.26 |

[a]Not detected

The following conclusions were drawn from Example 2.
i) Ethyl acetate can be used to effectively remove lipids from protein-fibre concentrates. Ethyl acetate is a good alternative for hexane.
ii) Ethanol can be used to effectively remove phenolic compounds from protein-fibre concentrates.
iii) Conventional hexane washing and toasting have a negative impact on EA (ability to form emulsions) and NS (nitrogen solubility). High values for EA and NS are generally regarded as indicators of usefulness of protein ingredients in food formulations. The process according to the invention provides protein-fibre concentrates with higher values for EA and NS than processes wherein conventional hexane washing and toasting are applied.

Description of the Analytical Methods and Equipment
Methods Used to Characterize the Raw Plant Material and Protein Fibre Concentrates
Protein Content The protein content in the protein-fibre concentrates was determined by the Kjeldahl method according to AOAC Official Method 2001.11(2005). A conversion factor of 6.25 was used to determine the amount of protein (wt %).

Dry Matter Content

A sample (2.0±0.5 g for raw plant material, 1.0±0.5 g protein fibre concentrates) was placed in a moisture analyzer at a temperature of 105° C. The moisture content was determined from the difference in the sample weight before and after drying.

Fat Content

The fat content was determined according to the Weibull-Stoldt Method. The sample was hydrolyzed with solution 10% (v/v) HCl and heated to 300° C. in the infrared heating system. The hydrolyzed sample was extracted with petroleum ether in the Extraction System. The fat content (X) was calculated according to the formula:

$$X = \frac{a-b}{c} \times 100\%$$

wherein:
a is the mass of the glass sample tube with the sample fat after drying (g);
b is the mass of the glass sample tube after drying (g); and
c is the mass of the sample (g).

Phenolic Content

The content of phenolic compounds was determined by the Folin-Ciocialteu method, as described by A. Siger et al., Rośliny Oleiste—Oilseed Crops, 2004, XXV(1), 263-274. Absorbance was measured at $\lambda$ 725 nm.

Phytate Content

The phytate content analysis was done in accordance to the phytic acid (phytate)/total phosphorus assay procedure K-PHYTY 08/14 by Phytic Acid (Total Phosphorus) Assay Kit Megazyme, as described by V. A. McKie and B. V. McCleary, Journal of AOAC International, 2016, 99(3), 738-743.

Carbohydrate Content

The chemical reaction of reducing sugars and 3,5-dinitrosalicylic acid (DNS) in an alkaline and high-temperature medium result in a colored product as described by G. L. Miller, Analytical Chemistry, 1959, 31, 426-428.

The protein-fibre concentrates according to the invention or obtainable by the process according to the invention comprise less than 1 wt % carbohydrates (simple sugars). The term 'carbohydrates (simple sugars)' as used herein refers to water-soluble monosaccharides, disaccharides and oligosaccharides, of which the amount is determined by converting the carbohydrates first to reducing sugars, also called 'simple sugars'. The (water-soluble) carbohydrate concentration in the protein-fibre concentrates was determined by (a) subjecting the water-soluble monosaccharides, disaccharides and oligosaccharides to acid hydrolysis to obtain reducing sugars, (b) reacting the reducing sugars with 3,5-dinitrosalicylic acid (DNS) in an alkaline and high-temperature medium resulting in a discoloration, (c) measuring the intensity of the red-brown color spectrophotometrically at $\lambda$ 540 nm, and (d) deriving the carbohydrate content in the protein-fibre concentrates from a calibration curve with glucose as standard.

Ethyl Acetate Content

A sample was prepared by extraction with hexane followed by Gas Chromatography with a Flame-ionization Detector (GC-FID) analysis. Chromatographic separation was performed using capillary column Stabilwax-DA, 30 m×0.25 mm×0.25 μm) and was used injector S/SL. The detector and injector temperatures were 250 and 200° C., respectively, injection volume 1 μL, helium flow at 1 mL/min. The oven temperature was maintained at 30° C. for 5 min then programmed to a final temperature of 115° C. which was held for 2 min. Hydrogen was used as carrier gas at a flow rate of 40 mL/min, and synthetic air flow rate was 280 mL/min, the split ratio was 1:25.

Ethanol Content

A sample was prepared by extraction with deionized water followed by Gas Chromatography with a Flame-ionization Detector (GC-FID) analysis. Chromatographic separation was performed using capillary column Stabilwax-DA, 30 m×0.25 mm×0.25 µm), and was used injector PTV. The detector and injector temperatures were 250 and 200° C., respectively, injection volume 0.5 µL, helium flow at 1 mL/min. The oven temperature was maintained at 70° C. for 4 min then programmed to a final temperature of 230° C. which was held for 15 min. Hydrogen was used as carrier gas at a flow rate of 40 mL/min, and synthetic air flow rate was 280 mL/min, the split ratio was 1:20.

Emulsifying Activity (EA) and Emulsifying Stability (ES)

The emulsifying activity and emulsifying stability were determined in accordance with the method as described by J. Vioque et al., *Journal of the American Oil Chemists' Society*, 2000, 77(4), 447-450, with the following minor modifications.

A sample (3.5 g) was homogenized for 30 s at 10000 rpm with 50 ml of demineralized water. Then, 25 ml of rapeseed oil was added and the mixture was homogenized for 30 s at 10000 rpm. Another portion of rapeseed oil (25 ml) was added and then homogenized for 90 s at 10000 rpm. The emulsion was centrifuged for 5 min at 1100 g at 22° C. in duplicate. The emulsifying activity was calculated as follows:

$$EA(\%) = \frac{\text{volume of the emulsified layer [ml]}}{\text{volume of emulsion before centrifugation [ml]}} \times 100$$

The samples obtained after the emulsifying activity measurement were heated at 85° C. for 15 min and then cooled for 15 min. Next, samples were centrifuged for 5 min at 1100 g at 22° C. The emulsifying stability was calculated as follows:

$$ES(\%) = \frac{\text{volume of the emulsified layer after heating [ml]}}{\text{volume of the emulsified layer before heating [ml]}} \times 100$$

Water Absorption Capacity (WAC) Oil Absorption Capacity (OAC)

The water and oil absorption was determined in accordance with the method as described by M. Garcia-Vaquero et al., *Food Research International*, 2017, 99(3), 971-978.

Nitrogen Solubility (NS)

The nitrogen solubility was determined in accordance with the method as described by Cheung, et al., *Food biophysics*, 2015 10(1), 30-38, with the following modifications.

A protein solution was prepared by dissolving a protein-containing sample (concentration of 2 wt %) in 150 mM NaCl and by adjusting the pH to 7.0 with 0.1 M HCl or with 0.1M NaOH. The resulting solution was incubated for 1 hour at 22° C. while vigorously shaking. Subsequently, samples were centrifuged at more than 4000 g for 30 minutes and the resulting supernatant was collected. The soluble protein content of the supernatant and the total amount of protein in the protein-containing sample were analyzed by the Kjeldahl method (×6.25). The Nitrogen solubility (NS) was defined as:

$$NS(\%) = \frac{\text{amount of soluble protein}}{\text{total amount of protein}} \times 100$$

Ash

The ash content was determined in accordance with Commission Regulation (EC) No 152/2009 of 27 Jan. 2009, Identification of crude ash in forage, page 56.

Total Fibre

The content of total fibre was determined according to the AOAC Official Method 991.43, Total, soluble, and insoluble dietary fibre in foods, Enzymatic—gravimetric method, MES-TRIS buffer, USA, 1994.

LITERATURE CITED

J. P. D. Wanasundara et al., Oilseeds and fats, Crops and Lipids, 2016, 23(4), D407

J. P. D. Wanasundara, *Critical Reviews in Food Science and Nutrition*, 2011, 51(7), 635-677

L. Campbell et al., Canola/Rapeseed Protein: Future Opportunities and Directions—Workshop Proceedings of IRC 2015, Plants 2016, 5, 17

Manashi Das Purkayastha et al., 2013, *J. Agric. Food Chem.*, 2013, 61, 10746-10756; dx.doi.org/10.1021/jf403657c|

Manashi Das Purkayastha et al., 2014, *J. Agric. Food Chem.*, 2014, 62, 7903-7914 dx.doi.org/10.1021/jf5023803|

G. L. Miller, *Analytical Chemistry*, 1959, 31, pp 426-428, 10

V. A. McKie and B. V. McCleary, *Journal of AOAC International*, 2016, 99(3), 738-743.

J. Vioque et al., *Journal of the American Oil Chemists' Society*, 2000, 77(4), 447-450

M. Garcia-Vaquero et al., *Food Research International*, 2017, 99(3), 971-978

A. Siger et al., *Rośliny Oleiste—Oilseed Crops*, 2004, XXV (1), 263-274

The invention claimed is:

1. A process for the preparation of a protein-fibre concentrate from plant material, wherein the plant material is selected from oilseeds, and wherein said plant material comprises between 10 and 50 wt % on dry weight basis of proteins and at least 5 wt %, on dry weight basis of fats, oils and lipids, said process comprising the steps of:
    a) crushing or comminuting the plant material to produce a solid cake;
    b) extracting the solid cake obtained in step a) using a first solvent comprising at least 90 wt % of water, based on the total weight of the first solvent, to obtain a mixture of a first solid fraction and a first liquid fraction;
    c) separating the first liquid fraction from the first solid fraction;
    d) adding a second solvent to the first solid fraction obtained in step c), wherein the second solvent comprises at least 60 wt % of a alcohol having 1 to 5 carbon atoms which is miscible with water at room temperature, based on the total weight of the second solvent;
    e) separating the mixture obtained in step d) into a second liquid fraction and a second solid fraction using a technique chosen from the group consisting of filtration, sedimentation, centrifugation and combinations thereof;

f) adding a third solvent to the second solid fraction obtained in step e), said third solvent comprising at least 90 wt % of an apolar and lipophilic organic ester having up to 5 carbon atoms, based on the total weight of the third solvent, wherein the apolar and lipophilic organic ester having up to 5 carbon atoms is at least partially miscible with the first solvent and fully miscible with the second solvent at room temperature, wherein the amount of the third solvent is chosen such that the overall liquid phase does not separate into distinct liquid phases;

g) separating the mixture obtained in step f) into a third liquid fraction and a third solid fraction using a technique chosen from the group consisting of filtration, sedimentation, centrifugation and combinations thereof;

h) subjecting the third solid fraction obtained in step g) to a technique chosen from the group consisting of vacuum drying, spray drying, superheated steam drying and/or combinations thereof to obtain a protein-fibre concentrate wherein the total content of protein and indigenous fibre is at least 30 wt %, based on total dry weight of the concentrate, wherein the process is performed without using organic or mineral solvents having 6 or more carbon atoms.

2. Process according to claim 1, wherein the plant material prior to step a) is at least partially depleted of protein-lean and lignin-rich outer layer having a form of coat, bark, husk, hull.

3. Process according to claim 1, wherein the plant material is at least partially defatted prior to step a) using mechanical means.

4. Process according to claim 3, wherein neither organic nor mineral solvents are used in the defatting step using mechanical means.

5. Process according to claim 1, wherein the extraction in step b) is performed under low-shear conditions.

6. Process according to claim 1, wherein the separation of the first liquid fraction from the first solid fraction in step c) is performed using a technique chosen from the group consisting of centrifugation, filtration and/or combinations thereof.

7. Process according to claim 1, wherein the first solvent in step b) is water or an aqueous solution comprising salts and optionally comprising further additives.

8. Process according to claim 1, wherein the alcohol having 1 to 5 carbon atoms which is miscible with water at room temperature is chosen from the group consisting of methanol, ethanol, propanol, iso-propanol, butanol, iso-butanol, and combinations thereof.

9. Process according to claim 1, wherein the weight ratio of the first solvent used in step b) to the second solvent used in step d) is between 1:10 and 1:1.

10. Process according to claim 1, wherein the apolar and lipophilic organic ester having up to 5 carbon atoms in the third solvent used in step f) is ethyl acetate.

11. Process according to claim 1, wherein the organic or mineral solvent having 6 or more carbon atoms is hexane.

12. Process according to claim 1, which is performed at a temperature between 0 and 70° C.

13. Process according to claim 1, which is performed at a pH between 5 and 8.

14. Process according to claim 1, wherein the first solid fraction after step c) and before step d) is subjected to an additional washing step using first solvent performed at a pH between 2 and 12 followed by a solid-liquid separation step.

15. Process according to claim 1, wherein the oilseeds are selected from the group consisting of rapeseed (canola), sunflower, safflower, cottonseed, flaxseed, and combinations thereof.

16. Process according to claim 1, wherein the protein-fibre concentrate comprises at least 30 wt % of indigenous protein and indigenous fibre based on dry matter.

17. Process according to claim 1, wherein the plant material comprises at least 10 wt %, on dry weight basis of fats, oils and lipids.

18. Process according to claim 1, wherein the alcohol having 1 to 5 carbon atoms which is miscible with water at room temperature is ethanol.

19. Process according to claim 1, wherein the weight ratio of the first solvent used in step b) to the second solvent used in step d) is between 1:3 and 2:3.

20. Process according to claim 1, which is performed at a temperature between 0 and 55° C.

21. Process according to claim 1, wherein the plant material is rapeseed.

* * * * *